United States Patent [19]
Dirks

[11] 3,878,867
[45] Apr. 22, 1975

[54] LIQUID LINE SHOCK ABSORBER

[75] Inventor: Richard D. Dirks, Shoreland Hills, Ind.

[73] Assignee: Josam Manufacturing Co., Michigan City, Ind.

[22] Filed: Nov. 14, 1973

[21] Appl. No.: 415,746

[52] U.S. Cl. .................................................. 138/30
[51] Int. Cl. ............................................ F16l 55/04
[58] Field of Search........................ 138/28, 30, 148

[56] References Cited
UNITED STATES PATENTS

| | | | |
|---|---|---|---|
| 2,583,231 | 1/1952 | Ragland | 138/30 |
| 3,625,242 | 12/1971 | Ostwald | 138/30 |
| 3,739,460 | 6/1973 | Addis et al. | 138/148 X |

FOREIGN PATENTS OR APPLICATIONS

| | | | |
|---|---|---|---|
| 1,230,571 | 4/1960 | France | 138/30 |

*Primary Examiner*—Charles A. Ruehl
*Attorney, Agent, or Firm*—P. D. Golrick

[57] ABSTRACT

A water and air impermeable elastomeric diaphragm bellows sleeve, mandrel formed or molded with longitudinal corrugations between cylindrical end portions, with the corrugated length circumferentially contracted by temporary binding, is inserted into a metal or plastic shell tube; and the sleeve end portions are expanded and sealingly secured to the surrounding shell end regions by respective molded elastomer retainers or adapters having a ribbed sleeve portion urging the respective end portion to sealing engagement, in smaller sizes, against the shell, and in larger sizes against the inner surface of an integral adapter collar portion in turn thereby urged into sealing engagement against the shell; the shell ends being closed by adherently bonded pipe-connecting caps or by one blind cap and a pipe-connecting adapter cap, to form respectively an "in-line" or an "on-line" shock absorber unit, after the gas-confining chamber defined between shell and sleeve is pressurized with air needle-injected at a through-shell elastomeric charging plug. Line service water pressure expands and ruptures the binding to free the corrugated length.

15 Claims, 7 Drawing Figures

PATENTED APR 22 1975 3,878,867
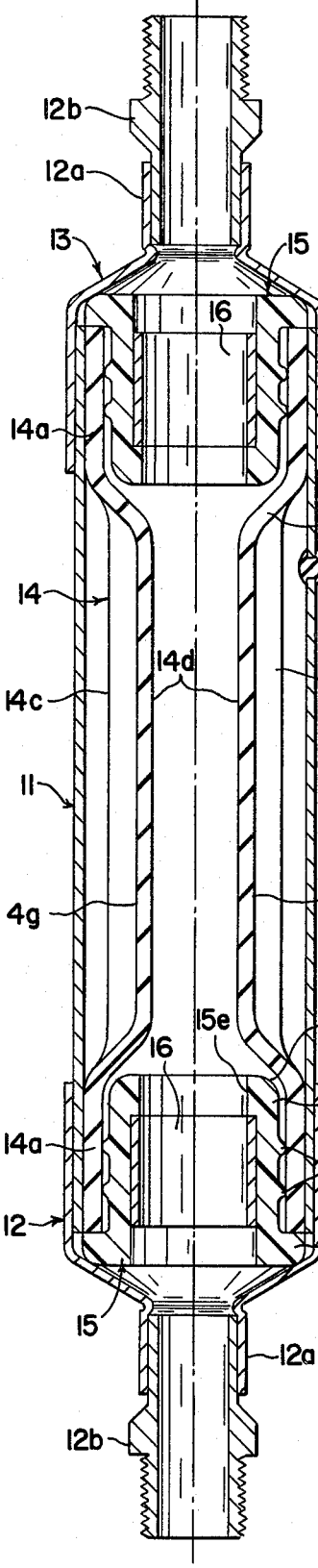
FIG. 1
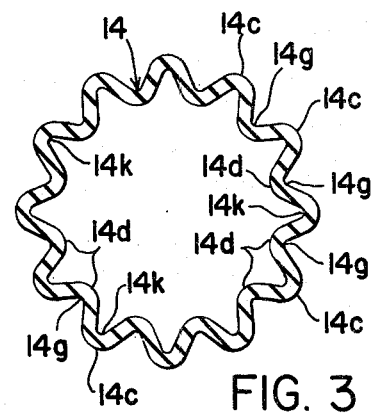
FIG. 3
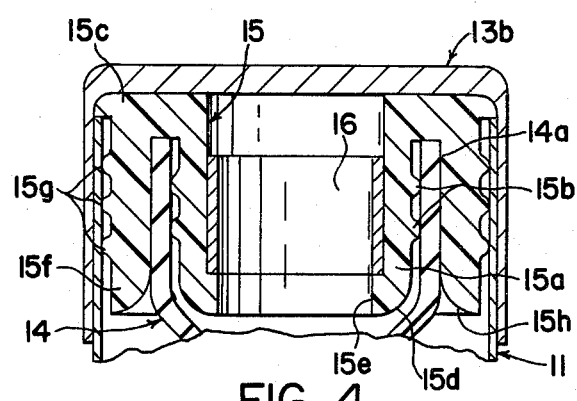
FIG. 2
FIG. 4
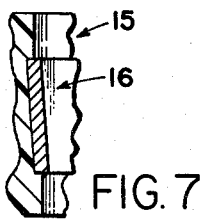
FIG. 7
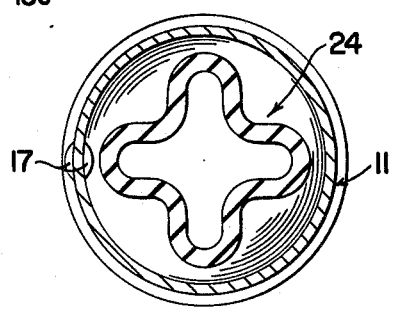
FIG. 6
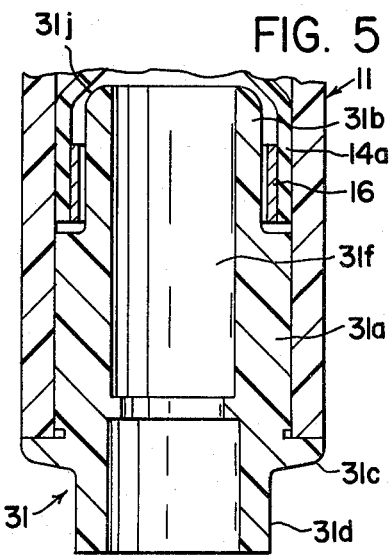
FIG. 5

LIQUID LINE SHOCK ABSORBER

Though this present invention is adapted to and relates to shock absorbers broadly, that is, which may be used for liquid flow lines generally by appropriate choice of materials, it will be described and discussed hereinafter in terms of a shock absorber as applied to water lines, rather commonly termed water "hammer arrester."

Shock absorbers for water supply piping systems, as well as other liquid conveying lines, are known to the prior art in wide variety wherein an elastomeric diaphragm or partitioning member within a housing separates a confined gas space or chamber from a water chamber in communication with the water transmission line to be protected against water hammer shock; including both a so-called "in-line" type shock absorber unit whereof the water chamber forms a part of the water line flow path, and in the so-called "upright" or "on-line" type, whereof the water chamber is a blind chamber, having merely a water connection to the water line.

The present invention relates to a more particular shock absorber unit wherein the elastic diaphragm or partition is an open-ended elastomeric sleeve having longitudinal corrugations, that is, circumferentially spaced alternating ribs and grooves, with smoothly curved crests and trough bottoms, so that in transverse cross section the corrugated portion of the sleeve length appears as having a "circularly" closed serpentine or undulating ring shape; this sleeve form being known insofar as thus generally described.

Prior art proposals for shock absorber units, utilizing a longitudinally corrugated sleeve, have labored under various disadvantages because involving components relatively complex or costly in view of the basically simple nature and function of the device, particularly for anchoring of the bellows sleeve within the shell or casing; or, with such comparative complexity or expense of structure not present, because yet entailing awkward fabrication or assembly procedures, and hence costs.

The present invention is particularly directed to improvements in the structure of the housing of the unit, the means of securing the elastomeric sleeve therein, and as well providing end-closing caps for a simple tube as the principal housing component, which not only provide simplification of overall structure and of components therefore, but also facilitate assembly; and thus the features of the invention, hereinafter more fully described in specific embodiments, are conducive to the production of a low cost yet rugged and effective unit.

The general object of the present invention is to provide a shock absorber unit of a type including an elastomeric sleeve as a diaphragm or partition separating a water receiving space, in communication with a line to be protected, from a captive gas space against which the elastomeric partition moves under the rising pressure of a shock wave to decrease the gas chamber size, thereby compressing the gas for absorption of the shock energy applied.

A still further object is to provide a simplified housing structure and means for securing the bellows sleeve element therein, enabling use of a standard sleeve diameter in diverse housing diameters, affording a method for achieving economy in production of a variety of unit sizes.

A still further object is the provision of structure for a shock absorber unit having a sleeve type elastic or diaphragm member of the longitudinally pleated or corrugated type in which the sleeve ends are each held in sealed anchored relation about the interior of a tubular shell by means including a ring; which expands the sleeve element end against the shell, holding it with an internal, or internal and external, element, in sandwiched radially compressed relation between ring and shell. A still further object is the provision of a simplified manner of providing end caps on the shell particularly adapted to the mode of securement of the sleeve ends.

Other objects and advantages will appear from the following description wherein:

FIG. 1 is a vertical longitudinal, axial section of a smaller shock absorber unit of the in-line type in accordance with the invention;

FIG. 2 is a fragmentary view partially in elevation and partially in section of a sleeve element used in FIG. 1;

FIG. 3 is a section taken through the sleeve as indicated by the line 3—3 in FIG. 2;

FIG. 4 is a fragmentary longitudinal section, showing modifications of FIG. 1 for larger size units and also on-line or upright units;

FIG. 5 is a fragmentary longitudinal axial section showing a further modification;

FIG. 6 is a transverse section showing a modification in the bellows sleeve corrugation section; FIG. 7 is a fragmentary exaggerated detail of an inside clamping ring modification.

A first shock absorber unit embodiment of the invention is shown in FIG. 1 as comprising a cylindrically tubular shell 11, with bottom and top end caps 12 and 13 sealingly secured thereto to form therewith a unit housing or casing; an elastomeric sleeve 14 with opposite end portions 14a circumferentially expanded and held, by respective molded elastomer anchoring devices or adapters 15 with expanded inside clamping rings 16, in anchored circumferentially sealed relation with the shell tube end regions, whereby a circumferential confined gas space or chamber is defined between the sleeve ends by the shell 11 and the sleeve 14. The elastomer adapters are hereinafter described in detail. Also there is sealingly lodged, through a small aperture in shell 11 to the gas chamber, an inert gas-retaining inlet or charging device 17, here comprising a known type of simple elastomeric sealing button of rivet-like and self-retaining configuration. A water chamber likewise is defined between the end caps 12, 13 and the sleeve 14; and these chambers or spaces are operable variable in volume by the shape change of the sleeve portion as a diaphragm separating them.

The device 17 is self-healing or sealing for retention of the gas, usually air, upon withdrawal of an air-charging needle inserted therethrough to pressurize the gas space.

However, alternative to provision of plug 17, the air may be needle-injected to the typically used 20 p.s.i. by a needle inserted through an adapter cap connection opening to pierce the bellows or diaphragm sleeve at the slope 14b between an anchoring device 15 and the main length of the contracted corrugations, where the needle or associated means ensures application of a hole "healing" composition at the surface of or in the needle-pierced elastomer. The shape of the bellows sleeve 14 appears in FIG. 1 as in a unit not yet gas-charged, nor under water line working pressure.

In FIG. 1, the two end caps 12 and 13 are identical adapter fitting type end caps, having the shape of a wrought copper reducing type sweated fitting, each having a reduced diameter portion 12a adapted for connection to water piping, so that the unit as a so-called in-line unit is connectable into a pipe line as part of the water flow path; a standard socket serving either to receive a pipe end or a fitting 12b providing a male thread. However, as shown in FIG. 4, one end cap may be a "blind cap" 13b simply to close off the top end of the housing and hence of the water chamber, providing a so-called upright or on-line unit, to be merely connected upright to the water line through the pipe connectable adapter cap at the other end.

The shell tube 11 and the end caps 12 and 13 (or blind cap 13b in FIG. 4) may be constituted of any water and air or inert gas impermeable material suitable for the intended environment and service, such as copper, aluminum, stainless steel or plastic of the type now accepted for water pipe service. The end caps are appropriately secured as hereinafter described.

For the bellows sleeve 14 and the anchors 15, intended for hot and cold water service, elastomers such as DuPont's "Nordel" and Goodrich "Hycar" are respectively suitable; but where other liquids are to be handled, the material is appropriately selected for its resistance to the liquid, and — in the case of the bellows sleeve— as well for its impermeability to the charging gas (usually air at 20 psi pressure). Thus for petroleum product lines there might be used B. F. Goodrich Rubber Company's "Hycar" or a similarly hydrocarbon resistant material which moreover is suitable for a wide variety of liquids including water.

This sleeve 14 may be mandrel-built or molded to the as-fabricated form, represented by FIGS. 2 and 3, having a generally external cylindrical shape, with the end portions 14a actually smooth annular cylinders; but with the intervening portion longitudinally pleated or corrugated, so that it may expand and contract radially, therefor circumferentially, with an accordion-like movement. The like alternating rounded ribs and grooves curve smoothly into each other, for example, as indicated in FIGS. 3, at the curved external crests 14c and intervening external grooves 14g, and at the inside rib crests and grooves 14k and 14d. As formed, in this particular sleeve, the crests of the external ribs lie at or slightly below the cylindrical geometrical envelope representing a continuation of the external surfaces of the end portions. The resulting cross section as shown in FIG. 3 is a closed sinuous, undulating or serpentine shape.

However, the bellows sleeve can be extruded with the unstressed, as-extruded cross section shown in FIG. 3, and the like end portions 14a re-shaped by subsequent molding to the hollow cylindrical form shown, with an external diameter preferably only slightly less than the inside diameter of the tube 11 for ease of insertion.

The sleeve securing or anchoring elements 15 may have the simpler form of FIG. 1 for smaller diameter units, or that appearing in FIG. 4 for larger sized units. In FIG. 1, each element comprises an internal sleeve portion 15a, a thick-walled hollow cylinder with an outside diameter substantially equal to the inside diameter of the bellows sleeve end portion 14a; having a plurality of spaced external circumferential ribs 15b, an outer end external flange 15c providing a sharp shoulder overlapping at least one of the adjacent bellows sleeve and shell tube end edges, as a stop; and having its inner end externally radiused at 15d for a purpose to be explained, and provided with a narrow inward lip 15e, affording a stop shoulder for ring 16. In FIG. 4 each element 15 further integrally comprises an external collar portion 15f, as a skirt joined to the outer end flange and concentric with the sleeve portion to define an annular slot receiving the bellows sleeve end portion to be anchored; the collar or skirt portion also having a plurality (here three) of spaced external circumferential ribs 15g engaging the shell wall and staggered or alternating offset in axial spacing relative to the ribs 15b.

Thus with the bellows sleeve 14 positioned in tube 11 and the annular elements 15 with the rings 16 then inserted, each ring 16 may be then radially expanded by appropriate known equipment to radially compress the end portions 14a and the anchor sleeve portions 15a sandwiched between ring and shell tube, thereby to make a gas tight seal at the same time mechanically gripping and securely anchoring the sleeve ends against the shell wall. Preferably the inner circular edge of each expandable ring 16 is somewhat rounded to aid insertion and avoid cutting of the elastomer.

A light coating of an appropriate bonding or sealing adhesive may be used between the bellows sleeve ends and the shell tube, also in conjunction with the retaining elements and rings, if under particular circumstances this be useful.

Alternatively the rings 16 may each have a slight external taper (see FIG. 7, with taper exaggerated from an inner narrower end so that upon being axially pressed into position they again develop the gripping or holding forces expanding and securing the sleeve end portions sealed against the shell tube; with or without use of adhesive as above.

Further variations in the shape of a ring 16 may be used; for example, as formed, a ring may have axially spaced, circumferential internal ribs, which, upon application of ring expansion force, by initially localized force application, locally deform the ring wall section outwardly raising an external circumferential rib, even before the general expansion of the ring takes place by force applied finally over its entire length.

In any event, for assembly, the major portion of the corrugated length of the twelve-lobed or ribbed diaphragm sleeve bellows element 14 is contracted radially inwardly causing the pleats to fold in accordion-like fashion by applying a few service-destructible rubber bands or by wrapping paper tape thereabout to contract it to the size of shape shown in FIG. 1; the sleeve is inserted within the shell, with or without coating the end regions with some sealant or bonding agent; the anchor elements are inserted; then the tapered type rings are inserted by pressure fit, or in the case of expansion rings they are simply inserted in position and then expanded by appropriate end working tooling gripping the external tube locally for this purpose; and then the end caps are placed.

Where a metal housing construction is used the metal caps and shell tube are secured by the use of an adhesive appropriate to give the requisite strength upon setting as are now known for bonding metals, thereby avoiding application of high heat by any soldered or brazing construction, or threading of the shell and caps, or swaging of the cap structure or other such operations. Thus suitable epoxy adhesives are available which cure in a fraction of a minute at temperatures under 200F, or at a very hot water temperature which might be encountered in service and for which the materials would in any event be specified.

Where the modern plastics used for water piping are used for cap and shell, then again known types of solvent cements as used for piping would be used to effect the necessary sealing and securement. Both of these operations of bonding by adhesives as between metal parts or the solvent cement bonding are comprehended in the term "adherently bonded" as herein used.

The adapter caps 12–13 have their piping connection portions 12a, 12b adapted to the character of the water lines to which connected, being internally or externally threaded for screwing onto a pipe or into an appropriate pipe fitting or coupling; or for the case of a plastic pipe system may simply be appropriately sized internally and externally for a cemented connection to plastic piping or fittings.

Since it is undesirable to heat the complete unit, even at an end cap, by temperatures involved in sweated joints, it is preferable, where copper end caps are used, that an appropriate threaded fitting be joined by brazing or soldering with the line-connecting caps before the latter be assembled in the unit.

FIG. 5 indicates a streamline form of end closure, especially for a plastic shell construction, where the ends of the shell tube are to outward appearance flush end capped by a flanged element 31. This may be, in gross shape, molded and then finished at tube mating surfaces by say screw machine operations, to provide a plug body 31a fitting the shell tube bore, with a reduced portion 31b extending with clearance into the anchored end region of the diaphragm tube, and an external tube end capping portion 31c, in effect a flanged end providing a circumferential flat shoulder abutting against the end of, and having the same outside diameter as, the shell tube; the element 31 having, to make a piping connection, a socketed projection 31d then in communication with a through bore 31f through the body 31a and extension 31b, aligned with the axis of the diaphragm sleeve. This basically represents the form of a corresponding blind cap in which the portion 31c merely extends smoothly curved over and closes the bore 31f. This affords a large adhesive bonding area or interface between shell and the capping elements as contrasted with the completely external cap structures.

FIG. 5 also shows another diaphragm sleeve anchoring arrangement, more suitable for smaller size units, wherein the internal ring 16 again of copper composition or other appropriate metal is expanded outwardly against the diaphragm sleeve cylindrical end 14a to circumferentially compress, seal and anchor it to the shell tube wall without intervention of other elements. However, this same general form of end capping may be used with the previously described forms of elastomeric adapter or anchor devices, but preferably omitting the projection 31b to afford a flat inner end which may engage the end of the elastomeric adapter for additional security.

It may be observed that even where the sleeve 14 takes a shape other than the longitudinally corrugated forms here shown, the casing structure with adherently bonded end caps and the elastomeric anchor devices 15 with expanded rings for elastomer sleeve end securement attain simplicity both of components and of the method for component fabrication and assembly as a shock absorber unit, this achieving a rugged durable effective structure and correspondingly lower cost.

In the upright or on-line modification shown in FIG. 4, the general housing construction and assembly involved in shell 11, the end caps 12 and 13b, the anchor devices 15 and air or gas charging plug 17 (or a small sized valve similar to a tubeless tire valve which may be an alternative) is generally similar to that described for the preceeding figures.

In these units, the same advantageous, now-known operative principle is involved, namely that in expanding and contracting during the oscillatory water hammer shock phenomenon, though the sleeve is flexing by the accordion-like circumferential "folding" and "unfolding" behavior of its "pleats" the primary and by far major energy absorption and release occurs in the gas rather than by potential energy change in the stretching and releasing of the elastomer.

The radius at 15d in FIG. 1 and FIG. 4, 31j in FIG. 5 and so also 15h in FIG. 4, provide round surfaces merging into areas of the adapter smoothly rather than edges to be encountered by the hollow sleeve in its operative flexing.

Where cementing of the anchoring adapters to bellows sleeve or shell is used, the adhesive of course must be selected to be compatable with the elastomer of the bellows sleeve; that is, to be not detrimental to the elastomer strength and life.

Particularly with respect to FIGS. 1, 4 and 5 it is to be noted that commercially available standard copper or plastic water piping tubing and respective sweated or cemented joint fitting components may be used for the shell 11, the blind caps 13b and adapter end caps 12–13.

The structure thus disclosed, moreover, enables use of a standard diaphragm sleeve diameter, hence standard extruded stock therefor, by virtue of the simple adapter type securement of the diaphragm sleeve end portions; and additionally by that securement structure, where a copper tubing shell is used, offers the further possibility that the bellows be secured longitudinally centered in a longer shell tube of copper after which the shell ends are spun down to endwise constrictions then sized say to receive the elements 12b, or otherwise worked to afford piping connections, rather than using separate end caps.

Thus the shell 11 and tube 26 may be standard type L copper tubing with the blind and adapter end caps respectively being correspondingly nominally sized standard caps and copper-to-copper type reducers, preferably of wrought copper. In like fashion, where the unit is to be all plastic, such components are selectable from standard plastic water tubing and corresponding fittings.

What I claim is:

1. A shock absorber unit for a liquid conveying line, comprising:
   a substantially rigid cylindrical shell tube;
   an elastomeric expansible and contractable diaphragm sleeve enclosed in said tube;
   securing means inserted in and anchoring each respective sleeve end into sealed anchored relation with the interior surface of the shell tube whereby there is defined a circumferential gas chamber between the tube, sleeve and sleeve ends; shell end caps fitted and sealingly secured onto the respective ends of said tube to define with the diaphragm sleeve interior, a liquid chamber, at least one of said caps being an adapter cap whereby liquid line piping may be connected to said unit to put the liquid in the line in communication with said liquid chamber;

said sleeve and shell being impervious to said liquid and to an inert gas captured in said gas chamber; each said securing means comprising a molded elastomeric anchor element affording an internal sleeve portion inserted in the respective diaphragm sleeve end and having a plurality of spaced external circumferential ribs for gripping engagement with the interior surface of the diaphragm sleeve end and also having an external circumferential outer end flange providing a radial stop shoulder extending over the edge of the adjacent end on at least one of the diaphragm sleeve and shell tube;

said securing means further including a generally cylindrical metal ring radially expanding the anchor sleeve portion to grippingly engage the interior of, and outwardly expand, the diaphragm sleeve end in retentive relation to surrounding structure.

2. A shock absorber unit as described in claim 1, wherein the inner end of said internal sleeve portion is externally radiused to facilitate insertion and provide a non-acute margin engageable by the diaphragm sleeve to minimize local stressing and wear upon operative flexing of the latter and further has an inward internal stop shoulder engaged by the said metal ring.

3. A shock absorber unit as described in claim 1, wherein said molded elastomeric element includes a coaxial skirt-like external collar portion integrally joined with the circumference of said outer end flange to define, with said internal sleeve portion, an annular slot with the respective end of said diaphragm sleeve retentively gripped therein, said external collar portion having a plurality of external circumferential ribs engaging the internal end surface of the respective shell tube end.

4. A shock absorber unit as described in claim 3, wherein there are two said ribs on the said internal sleeve portion and at least three said ribs on the collar portion spaced to alternate in axial position.

5. A shock absorber unit as described in claim 1, wherein each of said caps is a fitting reducer adapter cap, whereby the unit may be incorporated in said line as a part of the liquid flow path.

6. A shock absorber unit as described in claim 1, wherein the other of said caps is a blind cap, closing off the respective shell end, whereby the unit is adapted to serve as an on-line or upright type unit.

7. A shock absorber as described in claim 1, wherein said diaphragm sleeve, in the length portion extending between the anchored end portions thereof and defining said circumferential gas chamber, is provided with like circumferentially spaced longitudinal corrugations; the successive ribs and grooves of the corrugations smoothly rounded to present in a transverse section of the sleeve a circularly closed serpentine section.

8. A shock absorber unit as described in claim 7, wherein each of said caps is a said adapter cap, whereby the unit may be incorporated in said line as a part of the liquid flow path.

9. A shock absorber unit as described in claim 7, wherein the other of said caps is a blind cap, closing off the respective shell end, whereby the unit is adapted to serve as an on-line device.

10. A shock absorber as described in claim 7, wherein said shell tube, at a location intermediate said caps, is provided with an inert gas-charging, gas-retaining inlet device.

11. A shock absorber unit as described in claim 7, wherein said caps are adherently bonded to said shell tube.

12. A shock absorber unit as described in claim 7, wherein said sleeve end portions have an as-formed non-corrugated cylindrical shape.

13. A shock absorber unit as described in claim 1, wherein said rings are externally tapered and pressed into position to expand the respective internal sleeve portions into sealed anchored relation.

14. A shock absorber unit as described in claim 1, wherein said rings in position are radially outwardly expanded to expand the respective sleeve end portions into sealed anchored relation.

15. A shock absorber as described in claim 1, wherein said end flange extends over the adjacent end edges of both the diaphragm sleeve and the shell tube.

* * * * *